Dec. 31, 1968 H. SEIDEL 3,419,823
PHASE-DIFFERENTIAL NETWORK
Filed April 10, 1967

INVENTOR
H. SEIDEL
BY
Sylvan Sherman
ATTORNEY

United States Patent Office 3,419,823

Patented Dec. 31, 1968

3,419,823

PHASE-DIFFERENTIAL NETWORK

Harold Seidel, Warren Township, Somerset County, N.J., assignor to Bell Telephone Laboratories, Incorporated, Murray Hill, N.J., a corporation of New Jersey Filed Apr. 10, 1967, Ser. No. 629,513
3 Claims. (Cl. 333—11)

ABSTRACT OF THE DISCLOSURE

This application describes a broadband phase-differential network comprising a 90 degree hybrid junction having an arbitrary power-division ratio and a 180 degree hybrid junction having a power-division ratio of unity. The incident signal is coupled to the 90 degree hybrid wherein it is divided into two quadrature components $\tilde{t}$ and $\tilde{k}$. These, in turn, are recombined in the 180 degree hybrid to produce two equal output signals having a relative phase angle $$\alpha=2 \arctan \left|\frac{\tilde{k}}{\tilde{t}}\right|$$

therebetween.

In the first embodiment of the invention, the phase angle $\alpha$ is determined by the power-division ratio of the 90 degree hybrid. In a second embodiment of the invention both hybrids have unity power-division ratios, and a separate variable attenuator is included between the hybrids. In this manner the ratio of $\tilde{k}$ to $\tilde{t}$ can be continuously varied to produce a continuously variable phase angle $\alpha$.

This invention relates to broadband, constant differential-phase networks.

BACKGROUND OF THE INVENTION

Broadband power dividers for divinding an electromagnetic signal into two components which are either 90 degrees or 180 degrees out of phase are well known in the art. However, for many applications, such as in phase-array antenna systems, it is often necessary to divide the signal into two equal components differing by an arbitrary phase angle. While this can be done readily over a relatively narrow frequency range, simple means for maintaining a constant phase differential over a broad frequency range are not available.

SUMMARY OF THE INVENTION

In accordance with the present invention, signals of arbitrary phase difference are produced by means of a 90 degree hybrid junction and a 180 degree hybrid junction. The incident signal is coupled first to the 90 degree hybrid which divides the signal into two quadrature components $\tilde{t}$ and $\tilde{k}$. These in turn are coupled to the 180 degree hybrid where they are recombined both in, and out of phase, to form two signal components $$\frac{\tilde{t}+\tilde{k}}{\sqrt{2}} \text{ and } \frac{\tilde{t}-\tilde{k}}{\sqrt{2}}$$

of equal amplitude, and phase difference $$\alpha=2 \arctan \left|\frac{\tilde{k}}{\tilde{t}}\right|$$

It is a feature of the invention that the phase angle $\alpha$ is constant over the range for which the ratio of $|\tilde{k}|$ to $|\tilde{t}|$ is constant. It is another feature of the invention that any arbitrary phase angle can be obtained simply by varying the ratio of $|\tilde{k}|$ to $|\tilde{t}|$.

In one embodiment of the invention to be described, the phase angle is determined by the power-division ratio of the 90 degree hybrid. In a second embodiment of the invention, a 3 db quadrature hybrid junction is used, and the ratio of the two signal components $|\tilde{k}|$ to $|\tilde{t}|$, coupled to the 180 degree hybrid, is controlled by means of a separate attenuator.

These and other objects and advantages, the nature of the present invention, and its various features, will appear more fully upon consideration of the various illustrative embodiments now to be described in detail in connection with the accompanying drawing.

DETAILED DESCRIPTION

Figure 1:
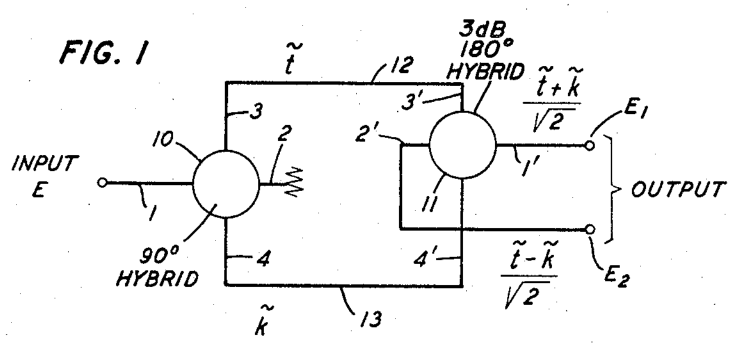
FIG. 1 shows a first embodiment of a constant phase-differential network in accordance with the invention comprising a 90 degree hybrid junction having an unequal power-division ratio, and a 3 db 180 degree hybrid junction.

Referring to the drawings, FIG. 1 shows a first embodiment of a broadband, constant phase-differential network, in accordance with the invention, comprising a 90 degree hybrid junction 10 and an equal power-division (i.e., 3 db) 180 degree hybrid junction 11. Each hybrid has two pairs of conjugate branches of which those associated with hybrid 10 are designated 1–2 and 3–4, and those associated with hybrid 11 are designated 1′–2′ and 3′–4′.

In the embodiment illustrated, branch 1 of hybrid 10 is the input branch to which the input signal is applied. Branch 2 is resistively terminated. Branches 3 and 4 of hybrid 10 are connected directly to branches 3′ and 4′ of hybrid 11 by means of identical wavepaths 12 and 13. The remaining branches 1′ and 2′ of hybrid 11 are the output branches.

Figure 2:
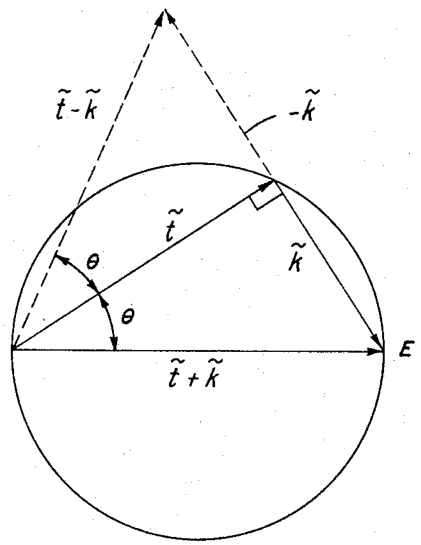
FIG. 2, included for purposes of explanation, is a vector diagram showing the various signal components in the network of FIG. 1.

In operation, the input signal E is divided into two quadrature components, $t$ and $\tilde{k}$, by the action of quadrature hybrid 10. The input signal and the two quadrature components can be represented by suitable vectors, as in the circle diagram of FIG. 2, in which input signal E lies along the circle diameter, and the two components $\tilde{t}$ and $\tilde{k}$ intersect along the periphery of the circle such that $\tilde{t}+\tilde{k}=E$. It will be noted that the relative magnitudes of $\tilde{t}$ and $k$ can assume any arbitrary ratio while still maintaining their quadrature phase relationship.

Upon being coupled into hybrid 11, the two signal components are recombined to produce an output signal sum $$E_1=\frac{\tilde{t}+\tilde{k}}{\sqrt{2}}$$

in branch 1′ and an output signal $$E_2=\frac{\tilde{t}-\tilde{k}}{\sqrt{2}}$$

in branch 2′.

Referring to the circle diagram, it is noted that the amplitude of $\tilde{t}+\tilde{k}$ is equal to the amplitude of $\tilde{t}-\tilde{k}$, so that $$|E_1|=|E_2|=\left|\frac{E}{\sqrt{2}}\right|$$

In addition, the phase angle $\alpha$ between $E_1$ and $E_2$ is equal to $$\alpha=2\theta=2 \arctan \left|\frac{\tilde{k}}{\tilde{t}}\right|$$

Since the relative magnitudes of the two signal components derived from the quadrature hybrid 10 depend upon the power-division ratio of this hybrid, and since this ratio can be designed to have any desired value, it is readily apparent that a phase-differential network, in accordance with the invention, can be designed to produce any arbitrary phase angle $\alpha$ between the two output signals $E_1$ and $E_2$.

As noted above, the 180 degree hybrid, on the other hand, is at all times a so-called "3 db" hybrid for which the power-division ratio is unity.

The bandwidth of the differential phase network of FIG. 1 is determined by the bandwidth of the two hybrid junctions. However, broadband quadrature hybrids and broadband 180 degree hybrids are well known in the art. For example, the design of broadband directional (quadrature) couplers is discussed by S. E. Miller and W. W. Mumford in a paper entitled "Multi-Element Directional Couplers," published in the September 1952 issue of the Proceedings of the Institute of Radio Engineers, vol. 40, pp. 1071–1078. See also, "Coupled Wave Theory and Waveguide Applications," by S. E. Miller, published in the Bell System Technical Journal, vol. 33, May 1954, pp. 661–719, and Multiplicity in Cascade Transmission Line Synthesis, Part II, by H. Seidel and J. Rosen, published in the Institute of Electronic and Electrical Engineers Transactions on Microwave Theory and Techniques, vol. MMT–13, No. 4, July 1965, pp. 398–467. Merrimac Research and Development, Inc., also advertises for sale broadband miniature and subminiature quadrature hybrids. Broadband 180 degree hybrids include, among other devices, the so-called "magic-T," and the transformer hybrid described in United States Patent 3,037,173, issued to C. L. Ruthroff.

Figure 3:
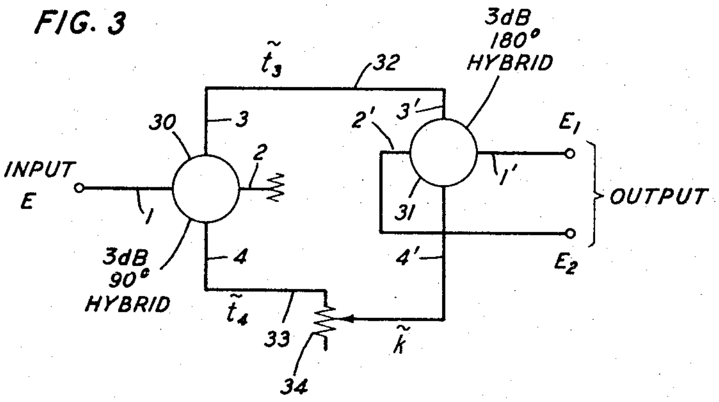
FIG. 3 shows a variable phase-differential network, in accordance with the invention, comprising two 3 db hybrid junctions and a variable attenuator.

In the embodiment of FIG. 1 described above, the phase angle $\alpha$ between the two output signal components $E_1$ and $E_2$ is determined by the power-division ratio of the quadrature hybrid. This is the preferred arrangement for those situations wherein a fixed output phase relationship is desired. However, in some situations it is often advantageous to be able to vary the phase angle as circumstances require. FIG. 3 shows a second embodiment of the invention adapted to permit continuous adjustment of the phase angle.

This second embodiment includes, as in FIG. 1, a 90 degree hybrid 30 and a 180 degree hybrid 31, interconnected by means of a pair of wavepaths 32 and 33. However, this second embodiment differs from that of FIG. 1 in that both hybrids are 3 db hybrids, having unity power-division ratios. Thus, the signal components $\tilde{t}_3$ and $\tilde{t}_4$ in branches 3 and 4 of hybrid 30 are equal $$\left(\tilde{t}_3=\tilde{t}_4=\frac{E}{\sqrt{2}}\right)$$

Also, in the embodiment of FIG. 3, one of the wavelengths 33 includes an adjustable attenuator 34, thereby providing a means for varying the amplitude of the signal component $\tilde{k}$ coupled to branch 4' of hybrid 31. Thus, the ratio of the signal components $\tilde{t}_3$ and $\tilde{k}$ applied to branches 3' and 4' of hybrid 31 is continuously variable, depending upon the setting of attenuator 34. Since the relative phase between output signals $E_1$ and $E_2$ is a function of the ratio of $|\tilde{k}|$ to $|t_3|$, the phase angle is, thus, also continuously variable. Once adjusted, however, the phase angle $\alpha$ is constant over the band of frequencies for which the hybrids operate.

It is apparent that in the embodiment of FIG. 1, the formation and recombination of signal components $\tilde{t}$ and $k$ involves purely reactive means. In the embodiment of FIG. 3, on the other hand, the formation of signal component $\tilde{k}$ involves resistive as well as reactive means and, hence, results in some loss in signal. In addition, any spurious phase variation introduced by attenuator 34 must be correspondingly compensated for in wavepath 32.

While only one phase-differential network has been included in each of the illustrative embodiments, it will be recognized that such networks can be cascaded to produce a plurality of output signals differing by any arbitrary phase angle. In such an arrangement, each of the output signals $E_1$ and $E_2$ comprises the input signal for the next stage. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A phase-differential network comprising:

a 90 degree hybrid junction having an arbitrary power-division ratio and a 180 degree hybrid junction having a power-division ratio of unity, each having first and second pairs of conjugate branches;

one branch of the first pair of conjugate branches of said 90 degree hybrid being an input branch, the other branch being resistively terminated;

the first pair of conjugate branches of said 180 degree hybrid comprising the output branches;

and means for connecting the second pair of branches of said 90 degree hybrid to the second pair of branches of said 180 degree hybrid such that the signals produced in the output braches of said 180 degree hybrid are equal in amplitude and have a relative phase angle $$\alpha=2\arctan\left|\frac{\tilde{k}}{\tilde{t}}\right|$$

therebetween, where $\tilde{k}$ and $\tilde{t}$ are the signals applied to the second pair of branches of said 180 degree hybrid.

2. The network according to claim 1 wherein the power-division ratio of said 90 degree hybrid junction is other than unity.

3. The network according to claim 1 wherein the power-division ratio of said 90 degree hybrid junction is unity; and wherein one of the wavepaths connecting said two hybrids includes an attenuator.

References Cited

UNITED STATES PATENTS 3,058,071 10/1962 Walsh et al. ---------- 333—11

HERMAN KARL SAALBACH, *Primary Examiner.*

PAUL GENSLER, *Examiner.*

U.S. Cl. X.R.

333—10; 328—155; 323—129